March 9, 1948.
G. F. RACKETT
2,437,361
FILM REGISTERING APPARATUS
Filed Feb. 17, 1944
2 Sheets-Sheet 2
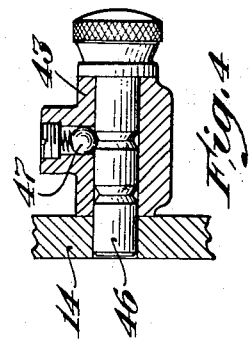
Inventor
Gerald F. Rackett
by Roberts, Cushman & Grover
Att'ys.

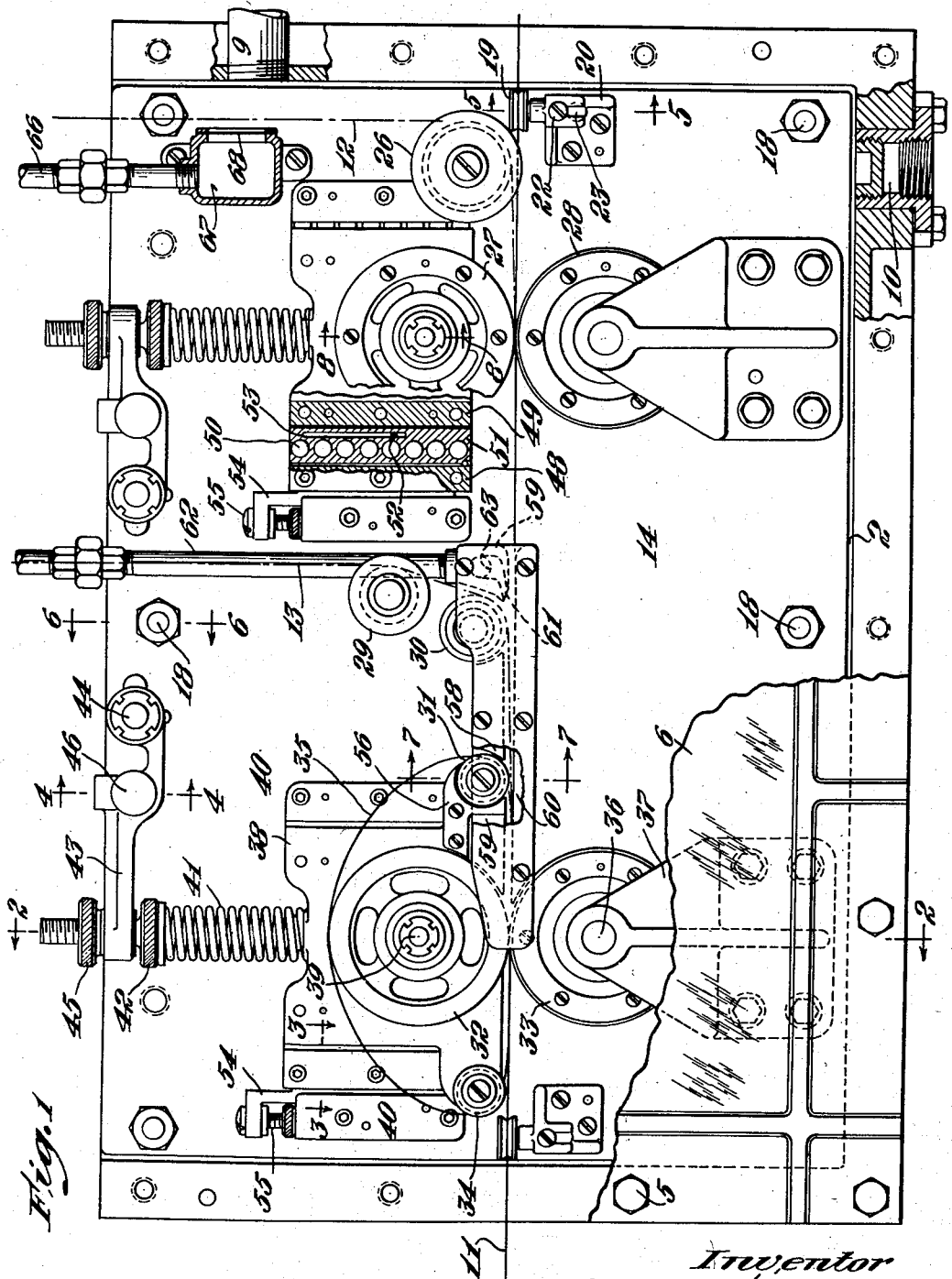

Patented Mar. 9, 1948

2,437,361

UNITED STATES PATENT OFFICE 2,437,361

FILM REGISTERING APPARATUS

Gerald F. Rackett, Los Angeles, Calif., assignor to Technicolor Motion Picture Corporation, Hollywood, Calif., a corporation of Maine Application February 17, 1944, Serial No. 522,711

4 Claims. (Cl. 271—2.3)

In various cinematographic processes it is necessary to bring a plurality of films together in face-to-face contact with each other with their sprocket holes in exact registration. Thus in the imbibition process a blank film is printed with one or more dye soaked matrices and, in the case of a multi-layer composite film having the differently sensitized layers joined together with transparent adhesive, after the film has been exposed and developed it has been proposed to transfer the layers to separate bases respectively to form color-separation films, the transfer involving the successive registration of the separate bases with the composite film preparatory to peeling off the layers. Examples of these processes are disclosed in copending application, Serial No. 440,324, filed April 24, 1942, now Patent No. 2,369,176, issued February 13, 1945, and the patents therein referred to.

The best way of effecting the aforesaid registration consists in bringing the films together on an endless belt or other carrier which has teeth fitting the sprocket holes of the films and which travels in an orbital path. The subject-matter of the present application constitutes improved apparatus for thus bringing the films together.

Objects of the present invention are to produce apparatus which seats the films on the carrier without damage to the films, which brings the films into intimate contact with each other throughout their widths, which excludes all air bubbles from between the films as they are brought together, which is simple and economical to manufacture, which can be assembled and disassembled with facility, and which is readily accessible for cleaning and repairing the parts.

In one aspect the improved apparatus comprises a pin-belt having teeth engageable in sprocket holes of the film, in combination with means for continuously feeding two films to the belt at spaced locations along its path, with a roller between the two locations for seating the first film on the belt before the second film is applied thereover and a roller beyond the second location for seating the second film over the first film.

In a more specific aspect the apparatus comprises a tank and a plate removably mounted in the tank for supporting the aforesaid rollers with the axes of the rollers perpendicular to the plate, together with means for detachably mounting the plate on a wall of the tank.

In still another aspect the apparatus comprises a carriage for each of the seating rollers together with guides for supporting the bearing for rectilinear movement toward and from the belt, the guides having raceways extending perpendicular to the plane of the film, with rollers in the raceways and a spring yieldingly urging the carriage along the raceways towards the belt, so that the film is pressed against the belt with substantially the same pressure at both margins of the film. Preferably the apparatus has means for laterally adjusting one of the raceways into snug contact with the rollers and in the preferred embodiment this means comprises a wedge movable lengthwise of the raceways.

For the purpose of illustration a typical embodiment of the invention is shown in the accompanying drawings in which Fig. 1 is a front elevation with parts broken away; and Figs. 2 to 8 inclusive are sections on lines 2—2 to 8—8 inclusive of Fig. 1.

The particular embodiment of the invention chosen for the purpose of illustration comprises a double tank having a bottom 1, a central partition 2 (Fig. 2), ends 3 and removable sides each including a frame 4 mounted on the tank with machine screws 5, a glass window 6 held on the frame with a rim 7 and screws 8. Each of the two compartments of the tank on opposite sides of the central partition 2 is provided with an overflow outlet 9 and a clean-out opening 10. The opposite ends of each of said compartments is provided with slits to permit the passage of one of the aforesaid pin belts through the tanks, one of these belts being shown at 11 in Fig. 1. As shown in Fig. 5 the belt 11 has teeth 11ª adapted to fit the sprocket holes of the film. As disclosed in the aforesaid patents suitable means may be provided at the slits to minimize the loss of water through the slits, it being understood that water is continuously supplied to the tank to replace the loss through the slits and keep the level of the water up to the outlet 9. One film is fed to the belt along the path indicated at 12 and another film is fed to the belt in superposition with the film along the path indicated at 13 (Fig. 1).

The means for guiding the belt and film and seating the film on the belt are mounted on detachable plates 14 which are mounted on opposite sides of the partition 2 as shown in Figs. 2 and 6. The mounting means comprises a stud 15 having an integral collar 16 seating in a recess on one side of the partition 2, with a nut 17 threaded thereon and seating in a recess on the other side of the partition, and nuts 18 threaded on opposite ends of the stud.

As shown in Figs. 1, 2 and 5 the means for guiding the belt 11 as it enters and leaves the tank comprises rollers 19 mounted on a bracket 20 which is secured to the supporting plate 14 by means of two screws and a dowel pin (Fig. 1), the rollers having grooved peripheries to receive the edges of the belt. As shown in Fig. 5 the roller next to the plate 14 is mounted directly on the bracket 20 and the outer roller is mounted on the bracket through the medium of a bifurcated arm 21 which straddles studs 22 and 23 and is pivotally mounted on the latter by means of a pin 24. Intermediate the arm 21 and the head of the stud 22 is a spring 25 which yieldingly presses the outer roller against the belt and thence presses the belt against the other roller. By swinging the arm 21 outwardly about the pivot 24 against the action of the spring 25 the belt 11 may be removed from between the rollers.

The film entering the tank along the path 12 first passes under a roller 26 and thence between upper and lower seating rolls 27 and 28. The film entering along path 13 passes under rolls 29, 30 and 31, thence between upper and lower seating rolls 32 and 33 and thence under another roller 34. An endless belt 35 travels around the rolls 31, 32 and 34 so that the upper seating roll 32 compresses the films against the belt 11 through the medium of the belt 35, the latter belt having sprocket holes fitting over the teeth 11ᵃ on the belt 11. The emulsion side of the film entering along the path 12 is washed by a jet of water supplied through pipe 66 and chamber 67 and a narrow slit in the cover plate 68, the slit extending diagonally of the plate and obliquely to both the longitudinal and transverse dimensions of the film. Thus the water is sprayed against the film in the form of a thin sheet. This water serves to replenish the loss through the slits for the belt 11, the excess overflowing through the outlet 9.

The lower seating rolls are rotatably mounted on pins 36 fast in bracket 37 secured to the outer face of plate 14. The upper seating rolls are mounted on vertically reciprocating carriages 38 by means of pivot pins 39, the carriages sliding up and down between vertical guides 40. At its lower end the left-hand carriage 38 (Fig. 1) has laterally extending ears upon the forward sides of which the rolls 31 and 34 are pivotally mounted. Each of the carriages is pressed downwardly by spring 41 the upper end of which seats against a screw 42 threaded through an arm 43 which is pivoted on the plate 14 by means of a pin 44. A nut 45 is threaded on the upper end of the screw 42 to serve as a lock. The arm 43 is held in the operative position shown in Fig. 1 by means of a pin 46 extending therethrough and thence into an opening in the back plate 14 (Fig. 4). By means of a ball detent 47 the pin 46 is yieldingly held either in the operative position shown in Fig. 1 or the inoperative position in which the end of the pin does not extend into the supporting plate 14. In the inoperative position the arm 43 may be swung upwardly to permit the withdrawal of the carriage 38 from between the guideways 40.

Interposed between each carriage and its guides are ball races 48 and 49 (Figs. 1 and 3), the race 48 being secured to the back plate and the race 49 being secured to the carriage. Interposed between the two raceways are balls 50 held in position by a bar 51 having openings to receive the balls. To prevent the bar 50 from falling away from the carriage when the carriage is removed, the bar is connected with the raceway 49 by means of a pin 52 extending through a slot 53 in the bar. The race 48 is adjustable toward the race 49 by means of a wedge 54 between the race and the stationary part 40, the wedge 54 being adjustable up and down by means of a screw 55 (Fig. 1). As shown in Fig. 3 there is sufficient clearance between the race 48 and the screws securing it to the plate 14 to permit the lateral adjustment of the race 48 when the screws are loosened.

As shown in Fig. 8 the peripheries of the upper seating rolls 27 have annular recesses 57 to receive the pins 11ᵃ projecting from the pin-belt, these recesses being formed in rings 58 detachably mounted on the sides of the roll 27. Thus the seating rollers bear on the film both inside and outside the pins or teeth 11ᵃ.

Mounted on the back plate 14, between the rolls 30 and 31 and the back plate, is a block 57 whose forward face is milled out to receive the rear flanges of the rolls 30 and 31 and whose left-hand end (Fig. 1) is shaped to conform to the periphery of the upper seating roll 32. Mounted on the forward face of the block 57 are three blocks whose thicknesses are approximately equal to the width of the rolls 30 and 31, namely a block 58 extending from roll 30 to roll 31 above the belt, a block 59 above the belt on the right-hand side of roll 30 (Fig. 1) and a block 60 extending along the under side of the belt to the lower seating roll 33, the block 60 serving as a support for the belt. Fast to the forward faces of blocks 58, 59 and 60 is a transparent cover plate 61 of Bakelite or the like.

As shown in Fig. 1 the block 59 has a hollow passageway 61 through which a jet of water is directed between the converging portions of the two films to clear out any foreign matter which may have found its way into this space. Water is supplied to the nozzle 61 through a pipe 62 which communicates with an opening 63 in the block 59.

It should be understood that the present disclosure is for the purpose of illustration only and that this invention includes all modifications and equivalents which fall within the scope of the appended claims.

I claim:

1. Film registering apparatus comprising a belt having teeth engageable in sprocket holes of the film, a tank having means for guiding said belt along a predetermined path therethrough, means for continuously feeding two films to the belt at spaced locations along said path, a roller between the two locations for seating the first film on the belt before the second film is applied thereover, a roller beyond the second location for seating the second film over the first film, a plate perpendicular to the axes of said rollers for supporting said means and rollers, and means for detachably mounting the plate on a wall of the tank, each of said seating rollers bearing on the film both inside and outside said teeth and having spaces to accommodate the teeth, whereby the first film is pressed tightly against the belt both inside and outside said teeth before the second film is seated on the first film.

2. Film registering apparatus comprising a belt having teeth engageable in sprocket holes of the film, a tank having means for guiding said belt along a predetermined path therethrough, means for continuously feeding two films to the belt at spaced locations along said path, a roller between the two locations for seating the first film on the belt before the second film is applied thereover, a roller beyond the second location for seating the second film over the first film, a plate perpendicular to the axes of said rollers for supporting said means and rollers, and means for detachably mounting the plate on a wall of the tank, the opposite wall of the tank being transparent so that the apparatus may be inspected without removing said plate from the tank, each of said seating rollers bearing on the film both inside and outside said teeth and having spaces to accommodate the teeth, whereby the first film is pressed tightly against the belt both inside and outside said teeth before the second film is seated on the first film.

3. In registering two films on a belt having teeth engageable in sprocket holes of the films, the belt feeding along a predetermined path and being at least approximately as wide as the film so that films can seat on the belt throughout substantially their entire width, the method which comprises feeding the two films to the belt respectively at two locations spaced along said path, between the two locations seating the first film on the belt, and beyond the second location separately seating the second film on the first film, each of said seating steps comprising compressing the belt and film both inside and outside said teeth, whereby the first film is pressed tightly against the belt both inside and outside said teeth before the second film is seated on the first film.

4. Film registering apparatus comprising a belt having teeth engageable in sprocket holes of the film, the belt being at least approximately as wide as the film so that film can seat on the belt throughout substantially its entire width, means for guiding the belt along a predetermined path, means for feeding two films to the belt respectively at two locations spaced along said path, means between the two locations for seating the first film on the belt, and means beyond the second location for separately seating the second film on the first film, each of said seating means comprising sets of rolls which compress the belt and film both inside and outside said teeth, the rolls on one side of the belt having spaces to accommodate the teeth, whereby the first film is pressed tightly against the belt both inside and outside said teeth before the second film is seated on the first film.

GERALD F. RACKETT.

REFERENCES CITED

The following references are of record in the file of this patent:

UNITED STATES PATENTS

| Number | Name | Date |
| --- | --- | --- |
| 1,707,695 | Troland | Apr. 2, 1929 |
| 1,707,699 | Whitney | Apr. 2, 1929 |